US012612032B2

(12) United States Patent
Takahashi

(10) Patent No.: US 12,612,032 B2
(45) Date of Patent: Apr. 28, 2026

(54) CONTROL METHOD OF AIR FUEL RATIO FOR HYBRID VEHICLE AND CONTROL DEVICE OF AIR FUEL RATIO FOR HYBRID VEHICLE

(71) Applicant: NISSAN MOTOR CO., LTD., Yokohama (JP)

(72) Inventor: Hideaki Takahashi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 57 days.

(21) Appl. No.: 18/294,772

(22) PCT Filed: Aug. 4, 2021

(86) PCT No.: PCT/JP2021/028890

§ 371 (c)(1),
(2) Date: Feb. 2, 2024

(87) PCT Pub. No.: WO2023/012918

PCT Pub. Date: Feb. 9, 2023

(65) Prior Publication Data

US 2024/0336254 A1     Oct. 10, 2024

(51) Int. Cl.
B60W 20/16 (2016.01)
B60W 10/06 (2006.01)
B60W 20/40 (2016.01)

(52) U.S. Cl.
CPC ............ B60W 20/16 (2016.01); B60W 10/06 (2013.01); B60W 20/40 (2013.01); *B60W 2530/12* (2013.01); *B60W 2710/0622* (2013.01)

(58) Field of Classification Search
CPC ...... B60W 20/16; B60W 10/06; B60W 20/40; B60W 2530/12; B60W 2710/0622; B60W 20/15; F02D 41/042; F02D 17/00; F02D 29/02; F02D 41/123; F02D 2200/0806; F02D 2200/0808; F02D 2200/60;
(Continued)

(56) References Cited

U.S. PATENT DOCUMENTS

| | | | |
|---|---|---|---|
| 9,527,497 B2 * | 12/2016 | Morita | ................ B60W 30/192 |
| 10,094,307 B2 | 10/2018 | Yoshizaki et al. | |
| 2024/0084754 A1 * | 3/2024 | Kondo | ................ F02D 41/0002 |

FOREIGN PATENT DOCUMENTS

| | | |
|---|---|---|
| EP | 3 730 770 A1 | 10/2020 |
| JP | H04-362221 A | 12/1992 |

(Continued)

*Primary Examiner* — Brian P Sweeney
(74) *Attorney, Agent, or Firm* — Foley & Lardner LLP

(57) ABSTRACT

A control method for a hybrid vehicle configured to switch between stoichiometric combustion and lean combustion in which the target air fuel ratio is set to be leaner than the theoretical air fuel ratio is provided. The control method for the hybrid vehicle includes when the combustion mode is switched from the lean combustion to the stoichiometric combustion, stopping a fuel supply to the internal combustion engine; decreasing an intake air amount of the internal combustion engine during the stop; setting the target air fuel ratio of the internal combustion engine to the theoretical air fuel ratio, or the air fuel ratio richer than the theoretical air fuel ratio, in a state in which the intake air amount of the internal combustion engine is decreased; and restarting the internal combustion engine.

11 Claims, 10 Drawing Sheets

(58) Field of Classification Search
CPC .. F02D 2250/21; F02D 41/0002; F02D 41/10;
F02D 41/1475; F02D 41/307; Y02T
10/62
See application file for complete search history.

(56)                    References Cited

FOREIGN PATENT DOCUMENTS

| JP | H08-158914 A | 6/1996 |
| JP | H09-112308 A | 4/1997 |
| JP | 2012-207581 A | 10/2012 |
| JP | 2020-016159 A | 1/2020 |

* cited by examiner

CONTROL METHOD OF AIR FUEL RATIO FOR HYBRID VEHICLE AND CONTROL DEVICE OF AIR FUEL RATIO FOR HYBRID VEHICLE

TECHNICAL FIELD

This invention relates to a control method for a hybrid vehicle, and a control device for the hybrid vehicle.

BACKGROUND ART

For example, a patent document 1 discloses an internal combustion engine configured to switch between a stratified combustion to stratify a combustion chamber, and to control an air fuel ratio to a first air fuel ratio larger than a theoretical air fuel ratio, and a homogenous combustion to uniformize mixed air within the combustion chamber, and to control to a second air fuel ratio (for example, a theoretical air fuel ratio) smaller than the first air fuel ratio.

An intake passage of the internal combustion engine of the patent document 1 is connected to a first bypass passage bypassing a supercharger and an intercooler, and a second bypass passage provided to bypass a throttle valve.

In this patent document 1, when the air fuel ratio is varied from the first air fuel ratio to the second air fuel ratio in accordance with the switching of the combustion mode, the air amount is gradually decreased by using a first bypass control valve provided on the first bypass passage, and a second bypass control valve provided on the second bypass passage, so as not to generate the torque shock, so as to suppress the sudden variation of the torque.

However, in the patent document 1, in a case in which the control of the air amount by the first bypass valve and the second bypass valve has a response delay, the decrease of the air amount is delayed at the variation of the air fuel ratio. The rotation of the internal combustion engine may be suddenly increased (The blow-up of the internal combustion engine may be generated).

That is, in the internal combustion engine in which the combustion mode is switched by switching the air fuel ratio, there is room for improvement so as not to provide the unnatural feeling to the driver due to the sudden increase of the rotation of the internal combustion engine at the switching of the air fuel ratio.

PRIOR ART DOCUMENT

Patent Document

Patent Document 1: Japanese Patent Application Publication No. H4-362221

SUMMARY OF THE INVENTION

A hybrid vehicle according to the present invention which is configured to switch between a stoichiometric combustion in which a target air fuel ratio of the internal combustion engine is set to a theoretical air fuel ratio, and a lean combustion in which the target air fuel ratio is set to be leaner than the theoretical air fuel ratio, the hybrid vehicle comprises:

when the combustion mode is switched from the lean combustion to the stoichiometric combustion, stopping a fuel supply to the internal combustion engine;

decreasing an intake air amount of the internal combustion engine during the stop;

setting the target air fuel ratio of the internal combustion engine to the theoretical air fuel ratio, or the air fuel ratio richer than the theoretical air fuel ratio, in a state in which the intake air amount of the internal combustion engine is decreased; and restarting the internal combustion engine.

In the hybrid vehicle according to the present invention, the sudden increase of the rotation of the internal combustion engine is suppressed at the switching of the combustion mode of the internal combustion engine from the lean combustion to the stoichiometric combustion. With this, it is possible to relieve the unnatural feeling of the driver.

DESCRIPTION OF EMBODIMENTS

Hereinafter, one embodiment according to the present invention is explained in detail with reference to the drawings.

Figure 1:
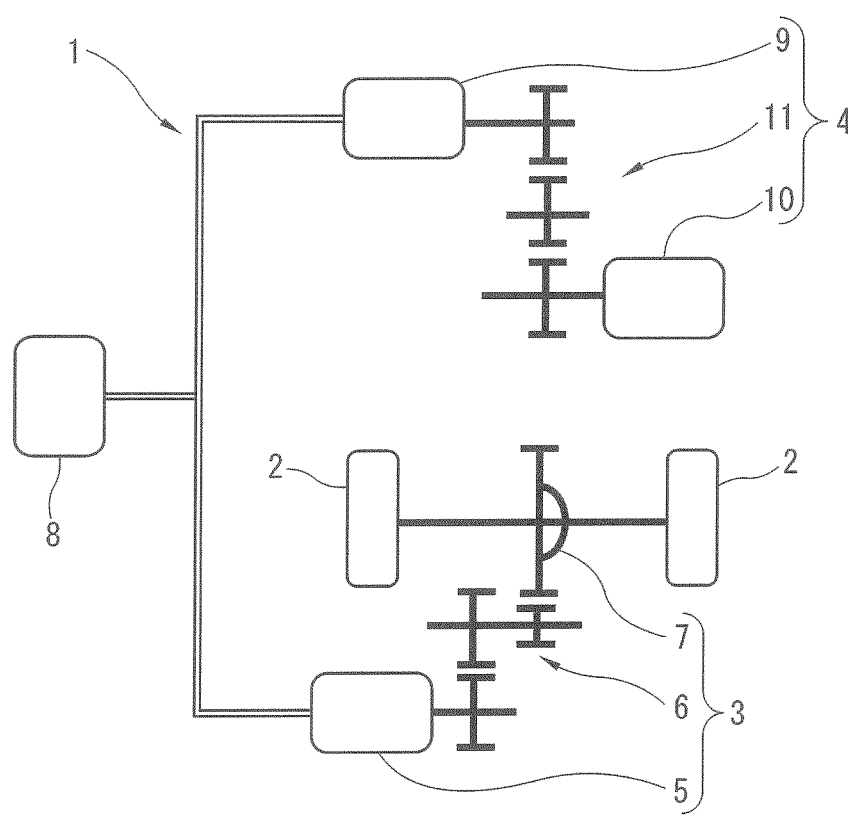
FIG. 1 is an explanation view schematically showing a configuration of a drive system of a vehicle to which the present invention is applied.

FIG. 1 is an explanation view schematically showing a configuration of a drive system of a vehicle 1 to which the present invention is applied. The vehicle 1 includes a drive unit 3 configured to drive driving wheels 2; and a power generation unit 4 configured to generate the electric power for driving the driving wheels 2.

The drive unit 3 includes a drive motor 5 which is a second electric motor configured to rotationally drive the driving wheels 2; and a first gear train 6 and a differential gear 7 which are configured to transmit a driving force of the drive motor 5 to the driving wheels 2. The drive motor 5 is configured to receive the electric power from a battery 8 to which the electric power generated by the power generation unit 4, and so on is charged.

The power generation unit 4 includes a generator 9 which is a first electric motor configured to generate the electric power supplied to the drive motor 5; an internal combustion engine 10 configured to drive the generator 9; and a second gear train 11 configured to transmit the rotation of the internal combustion engine 10 to the generator 9.

The vehicle 1 is a series hybrid in which the internal combustion engine 10 is not used as the power. For example, the vehicle 1 is configured to drive the internal combustion engine 10 for charging the battery 8 when a battery residual (remaining) amount of the battery 8 becomes small, and thereby to generate the electric power by the generator 9.

The drive motor 5 is a direct drive source of the vehicle 1. For example, the drive motor 5 is configured to be driven by the AC power from the battery 8. Moreover, the drive motor 5 is configured to function as the generator at the deceleration of the vehicle 1.

The generator 9 is configured to convert the rotation energy generated at the internal combustion engine 10 to the electric energy, and, for example, to charge the battery 8. Moreover, the power generator 9 has a function as an electric motor configured to drive the internal combustion engine 9. The power generator 9 can perform the motoring of the internal combustion engine 10. The power generator 9 may be used as a starter motor of the internal combustion engine 10. Besides, for example, the electric power generated at the power generator 9 may be directly supplied to the drive motor 5 in accordance with the driving condition, in place of charging the battery 8.

The internal combustion engine 10 is configured to transmit a rotation of a crank shaft to a rotor of the power generator 9. The internal combustion engine 10 is configured to vary an air fuel ratio. The internal combustion engine 10 is configured to switch and use a stoichiometric combustion which is a first combustion mode, and a lean combustion which is a second combustion mode. The stoichiometric combustion is a combustion in which a target air fuel ratio is a theoretical air fuel ratio (stoichiometric). The lean combustion is a lean combustion in which the target air fuel ratio is greater than that of the theoretical air fuel ratio.

Figure 2:
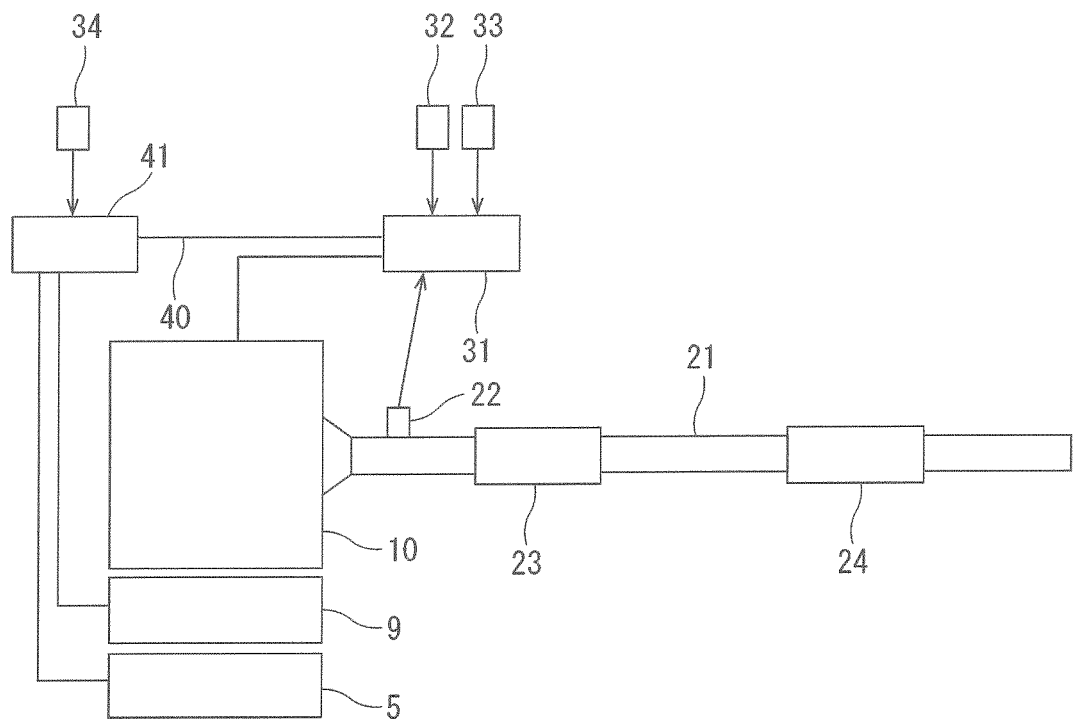
FIG. 2 is an explanation view schematically showing a system configuration of an internal combustion engine.

FIG. 2 is an explanation view schematically showing a system configuration of the internal combustion engine 10. An air fuel ratio sensor 22, a first catalyst 23, and a second catalyst 24 are provided to an exhaust passage 21 of the internal combustion engine 10.

The air fuel ratio sensor 22 is configured to sense an exhaust gas air fuel ratio on an upstream side of the first catalyst 23. The air fuel ratio sensor 22 is, for example, a wide area type air fuel ratio sensor having a substantially linear output characteristic according to the exhaust gas air fuel ratio.

The first catalyst 23 is a catalyst for the exhaust gas purification, which is made, for example, from a three-way catalyst. The second catalyst 24 is an NOx trap catalyst which is positioned on a downstream side of the first catalyst 23.

The second catalyst 24 is configured to adsorb NOx in the exhaust gas at the drive at which the air fuel ratio is learner than the theoretical air fuel ratio, and to desorb and reduce (purify) NOx at the drive at which the air fuel ratio is richer than the theoretical air fuel ratio. That is, the second catalyst 24 is configured to adsorb NOx in the exhaust gas when the exhaust gas air fuel ratio is lean, and to desorb, reduce, and purify the adsorbed NOx by using HC and CO in the exhaust gas as a reducing agent when the exhaust gas air fuel ratio is rich.

The air fuel ratio of the internal combustion engine 10 is controlled by an ECU (engine control unit) 31. The switching between the stoichiometric combustion and the lean combustion in the internal combustion engine 10 is controlled by the ECU 31. The combustion mode of the internal combustion engine 10 is determined in accordance with an engine speed of the internal combustion engine 10, and a torque (for example, a target torque) of the internal combustion engine 10.

The ECU 31 is a known digital computer including a CPU, a ROM, a RAM, and an input/output interface. The ECU 31 is configured to appropriately control an ignition timing of the internal combustion engine 10, an intake air amount of the internal combustion engine 10 as the air amount, based on the detection signals of various sensors, and to control the air fuel ratio of the internal combustion engine 10. That is, the ECU 31 corresponds to a first control section and a second control section which are configured to control the drive of the internal combustion engine 10.

The ECU 31 is configured to receive detection signals of various sensors such as an air flow meter 32 configured to sense the intake air amount, and a crank angle sensor 33 configured to sense a crank angle of the crank shaft of the internal combustion engine 10, in addition to the detection signal from the above-described air fuel ratio sensor 22. The crank angle sensor 33 is configured to sense the engine speed of the internal combustion engine 10.

The ECU 31 is configured to search from a predetermined data previously stored in the ROM of the ECU 31 by using, for example, the engine speed and the fuel injection amount of the internal combustion engine 10 as the parameters, and to determine a collection amount of the NOx per unit time. The ECU 31 is configured to accumulate these, and to calculate the NOx amount (the NOx adsorption amount) collected by the second catalyst 24. Besides, the NOx amount collected by the second catalyst 24 may be calculated by known various methods other than the above described method.

The ECU 31 is connected and communicated to an HCU (hybrid control unit) 41 configured to integrally control the vehicle 1 through a communication line 40. The HCU 41 is configured to control the drives of the drive motor 5 and the power generator 9. Moreover, the HCU 41 is configured to receive a detection signal of an accelerator opening degree sensor 34 configured to sense a depression amount of an accelerator pedal.

When the air fuel ratio of the internal combustion engine 10 is switched from the lean air fuel ratio (the air fuel ratio leaner than the theoretical air fuel ratio) to the theoretical air fuel ratio, a throttle valve (not shown) is immediately closed. In this case, the actual air amount has a response delay. Accordingly, in a case in which the fuel injection amount is set to a constant value so as to obtain the same torque before and after the switching of the air fuel ratio, the equivalence ratio is gradually increased.

Moreover, there is an intermediate air fuel ratio between the air fuel ratio for the lean combustion (lean air fuel ratio), and the air fuel ratio for the stoichiometric combustion (the theoretical air fuel ratio). In the intermediate air fuel ratio, the NOx concentration discharged from the internal combustion engine 10 becomes high. Accordingly, in a transition of the switching of the combustion mode from the lean combustion to the stoichiometric combustion, the air fuel ratio of the internal combustion engine 10 becomes the intermediate air fuel ratio, so that the NOx amount discharged from the internal combustion engine 10 is deteriorated.

Figure 3:
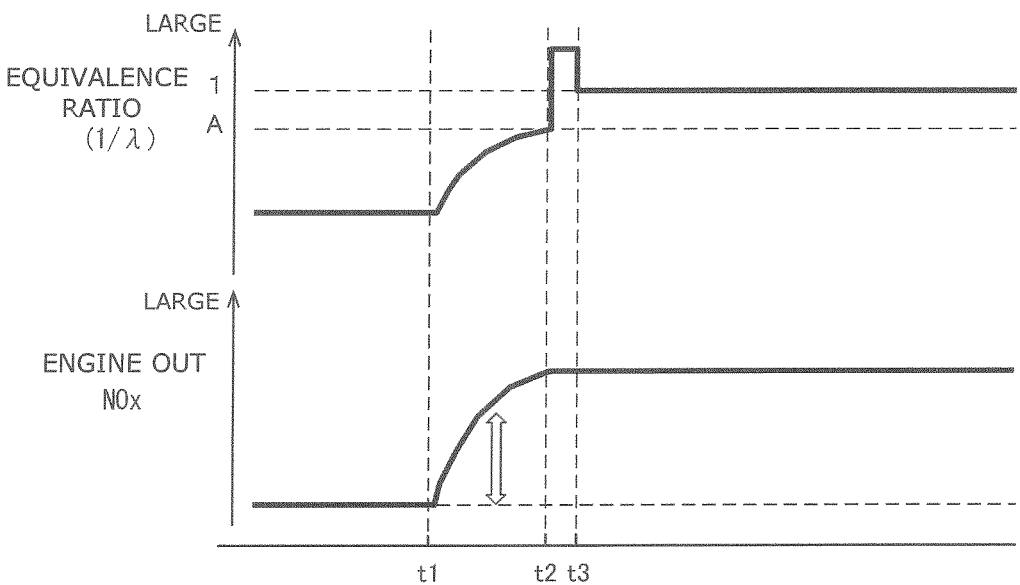
FIG. 3 is an explanation view showing a relationship between an equivalence ratio and an engine out NOx.

FIG. 3 is an explanation view showing a relationship between the equivalence ratio, and the engine out NOx. As shown in FIG. 3, when the equivalence ratio becomes large, NOx (the engine out NOx) discharged from the internal combustion engine 10 is increased. NOx collected by the second catalyst (NOx trap catalyst provided in the exhaust passage 21) can be treated by the rich spike when the equivalence ratio becomes large to a certain degree. The rich spike is performed by temporarily setting the air fuel ratio to the air fuel ratio richer than the theoretical air fuel ratio.

Time t1 in FIG. 3 is a timing at which the air fuel ratio of the internal combustion engine 10 is gradually varied from the lean air fuel ratio to the theoretical air fuel ratio. Time t2 in FIG. 3 is a timing at which the air fuel ratio is immediately varied to start the rich spike. The rich spike is started, for example, when the equivalence ratio becomes a predetermined value A. Time t3 in FIG. 3 is a timing at which the rich spike is finished. In FIG. 3, time t2 to time t3 is a period during which the rich spike is performed. In FIG. 3, the air fuel ratio after time t3 is the theoretical air fuel ratio.

Figure 4:
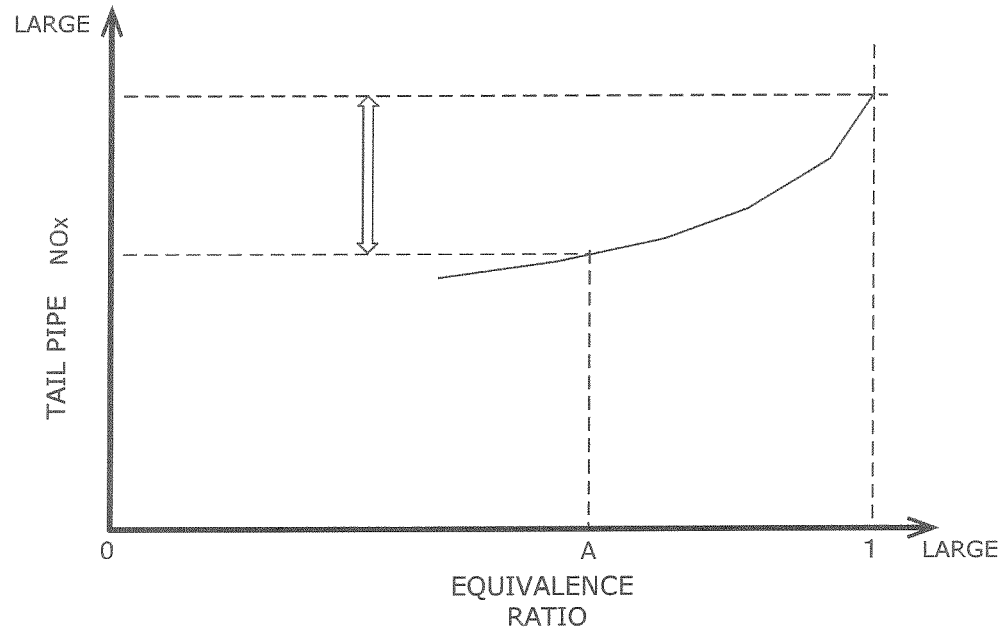
FIG. 4 is an explanation view showing a relationship between NOx discharged from a tail pipe, and the equivalence ratio.

FIG. 4 is an explanation view showing a relationship between the equivalence ratio and NOx discharged from a tail pipe. As shown in FIG. 4, it is possible to suppress NOx discharged from the tail pipe as the equivalence ratio when the air fuel ratio is immediately varied from the lean air fuel ratio to the theoretical air fuel ratio, or the air fuel ratio richer than the theoretical air fuel ratio is smaller, that is, as the air fuel ratio is larger (the air fuel ratio is leaner). This is because it is possible to decrease the NOx amount discharged from the internal combustion engine 10 in a period (period of time t1 to t2 in FIG. 3) in which the air fuel ratio is gradually varied toward the theoretical air fuel ratio.

The ECU 31 is configured to stop the fuel supply to the internal combustion engine 10 when the combustion mode of the internal combustion engine 10 is switched from the lean combustion to the stoichiometric combustion, and to decrease the intake air amount of the internal combustion engine 10 during this stop. The ECU 31 is configured to restart the internal combustion engine 10, by setting the target air fuel ratio of the internal combustion engine 10 to the theoretical air fuel ratio, or the air fuel ratio richer than the theoretical air fuel ratio, in a state in which the intake air amount is decreased from the amount before the stop of the fuel supply to the internal combustion engine 10.

With this, in the vehicle 1, when the combustion mode of the internal combustion engine 10 is switched from the lean combustion to the stoichiometric combustion, it is possible to suppress the sudden torque increase, and the sudden rotation increase of the internal combustion engine 10, without using the intermediate air fuel ratio in which the engine out NOx is high, and to relieve the unnatural feeling of the driver.

The ECU 31 is configured to stop the rotation of the internal combustion engine 10 when the combustion mode is switched from the lean combustion to the stoichiometric combustion, and to switch the air fuel ratio to the theoretical air fuel ratio, or the air fuel ratio richer than the theoretical air fuel ratio when the internal combustion engine 10 is restarted.

When the combustion mode is switched from the lean combustion to the stoichiometric combustion, the internal combustion engine 10 is configured to switch the air fuel ratio to the air fuel ratio for the stoichiometric combustion in a state in which the rotation of the internal combustion engine 10 is stopped. Accordingly, it is possible to avoid the air fuel ratio from being the intermediate air fuel ratio. Therefore, the vehicle 1 can avoid the deterioration of the NOx performance when the combustion mode of the internal combustion engine 10 is switched from the lean combustion to the stoichiometric combustion.

Moreover, the internal combustion engine 10 is not configured to suddenly switch the air fuel ratio. The internal combustion engine 10 is configured to temporarily stop the internal combustion engine 10, and to restart the internal combustion engine 10. Accordingly, it is possible to avoid the sudden torque increase at the switching.

When the combustion mode is switched from the lean combustion to the stoichiometric combustion, the ECU 31 may be configured to perform the fuel cut at which the fuel supply to the internal combustion engine 10 is stopped, and to switch the air fuel ratio to the theoretical air fuel ratio, or the air fuel ratio richer than the theoretical air fuel ratio at the fuel cut recovery at which the fuel supply to the internal combustion engine 10 is restarted after the fuel cut.

When the combustion mode of the internal combustion engine 10 is switched from the lean combustion to the stoichiometric combustion, the vehicle 1 can suppress the unnatural feeling to the driver, relative to a case in which the rotation of the internal combustion engine 10 is temporarily stopped.

The internal combustion engine 10 is configured to switch the combustion mode from the lean combustion to the stoichiometric combustion when the NOx amount collected by the second catalyst 24 becomes equal to or greater than a predetermined first threshold value.

The first threshold value is, for example, a threshold value at which NOx (the tail pipe NOx) discharged from the tail pipe through the second catalyst 24 is suddenly deteriorated. When the NOx amount collected by the second catalyst 24 becomes equal to or greater than the second threshold value, it is necessary to treat NOx of the second catalyst 24 as soon as possible.

When the NOx amount collected by the second catalyst 24 is smaller than the first threshold value, and equal to or greater than the predetermined second threshold value smaller than the first threshold value, the air fuel ratio switching request by the exhaust gas (the stoichiometric request by the exhaust gas) is satisfied.

When this stoichiometric request by the exhaust gas is satisfied, the ECU 31 is configured to switch the combustion mode from the lean combustion to the stoichiometric combustion after waiting for the generation of the predetermined switching request.

The second threshold value is, for example, a threshold value at which NOx (the tail pipe NOx) discharged from the tail pipe through the second catalyst 24 is gradually deteriorated. When the NOx amount collected by the second catalyst 24 is equal to or greater than the second threshold value, and smaller than the first threshold value, it is unnecessary to immediately treat NOx of the second catalyst 24. However, it is necessary to treat NOx of the second catalyst 24 as soon as possible.

The switching request is a request for setting the air fuel ratio to the lean side, or the stoichiometric side. For example, when it is necessary to ensure the brake negative pressure of the vehicle 1 during the lean combustion, the request for setting the air fuel ratio to the stoichiometric side is generated.

In a case in which the NOx amount collected by the second catalyst 24 is in a range in which the performance deterioration of the second catalyst 24 is not large (when the NOx amount collected by the second catalyst 24 is equal to or greater than the second threshold value, and smaller than the first threshold value) even when the lean air fuel ratio is continued, the vehicle 1 can suppress the frequency of the stop of the rotation of the internal combustion engine 10 in accordance with the switching of the combustion mode, by waiting for the generation of the switching request. Moreover, it is possible to improve the fuel economy.

In a case in which the internal combustion engine 10 is stopped by the satisfaction of the predetermined internal combustion engine stop condition when the NOx amount collected by the second catalyst 24 is equal to or greater than the second threshold value, or smaller than the first threshold value, the ECU 31 may be configured to restart the internal combustion engine 10 after the satisfaction of the predetermined internal combustion engine start condition. The predetermined internal combustion engine stop condition is, for example, a case in which SOC of the battery 8 is equal to or greater than a predetermined upper limit threshold value, a case in which the accelerator pedal is brought to the OFF state during the traveling, and so on. The predetermined internal combustion engine start condition is, for example, a case in which the SOC of the battery 8 becomes equal to or smaller than the lower limit threshold value, a case in which the accelerator pedal is brought from the OFF state to the ON state, and so on.

With this, the vehicle 1 can suppress the frequency of the stop of the rotation of the internal combustion engine 10.

In a case in which the request torque of the internal combustion engine 10 is greater than the predetermined value when the combustion mode of the internal combustion engine 10 is switched from the lean combustion to the stoichiometric combustion, the ECU 31 may be configured to immediately switch the air fuel ratio without waiting for the decrease of the intake air amount.

In a case in which the request torque of the internal combustion engine 10 is large, even when the sudden torque variation is generated, actually, the driver does not largely feel this. Accordingly, the vehicle 1 can instantaneously ensure the required large output without providing the feeling of the large torque variation to the driver.

When the combustion mode is switched from the lean combustion to the stoichiometric combustion, the ECU 31 is configured to vary the opening degree of the throttle valve configured to control the intake air amount of the internal combustion engine 10, to an opening degree corresponding to the target air fuel ratio, during the stop of the rotation of the internal combustion engine 10, or during the fuel cut of the internal combustion engine 10.

When the combustion mode of the internal combustion engine 10 is switched from the lean combustion to the stoichiometric combustion, the vehicle 1 is configured to vary the opening degree of the throttle valve during the stop of the rotation of the internal combustion engine 10, or during the fuel cut of the internal combustion engine 10. Accordingly, it is possible to keep the torque variation at the switching from the lean combustion to the stoichiometric combustion, within a range of the torque variation at the normal restart of the internal combustion engine 10, or at the normal fuel cut recovery.

When the combustion mode is switched from the lean combustion to the stoichiometric combustion, the ECU 31 is configured to vary the opening degree of the throttle valve configured to control the intake air amount of the internal combustion engine 10, to the opening degree smaller than the opening degree corresponding to the target air fuel ratio, at the restart of the internal combustion engine 10 from the stop of the rotation of the internal combustion engine 10, then to keep the opening degree during a predetermined time period, and to stepwisely vary the opening degree of the throttle valve to the opening degree corresponding to the target air fuel ratio.

The vehicle 1 is configured to throttle the opening degree of the throttle valve at the restart of the internal combustion engine 10 to decrease the air amount at the regeneration of the second catalyst 24, and thereby to improve the exhaust performance at the regeneration of the second catalyst 24.

When the combustion mode is switched from the stoichiometric combustion to the lean combustion, the ECU 31 may be configured to stop the fuel supply to the internal combustion engine 10, to decrease the intake air amount of the internal combustion engine 10 during the stop, and to restart the internal combustion engine 10 by setting the target air fuel ratio of the internal combustion engine 10 to the air fuel ratio leaner than the theoretical air fuel ratio in a state in which the intake air amount of the internal combustion engine 10 is decreased (smaller) than the amount before the stop of the fuel supply to the internal combustion engine 10.

When the combustion mode is switched from the stoichiometric combustion to the lean combustion, the ECU 31 may be configured to stop the rotation of the internal combustion engine 10, and to switch the air fuel ratio to the air fuel ratio leaner than the theoretical air fuel ratio at the restart of the internal combustion engine 10.

When the combustion mode is switched from the stoichiometric combustion to the lean combustion, the ECU 31 may be configured to perform the fuel cut to stop the fuel supply to the internal combustion engine 10, and to switch the air fuel ratio to the air fuel ratio leaner than the theoretical air fuel ratio at the fuel cut recovery to restart the fuel supply to the internal combustion engine 10 after the fuel cut.

Figure 5:
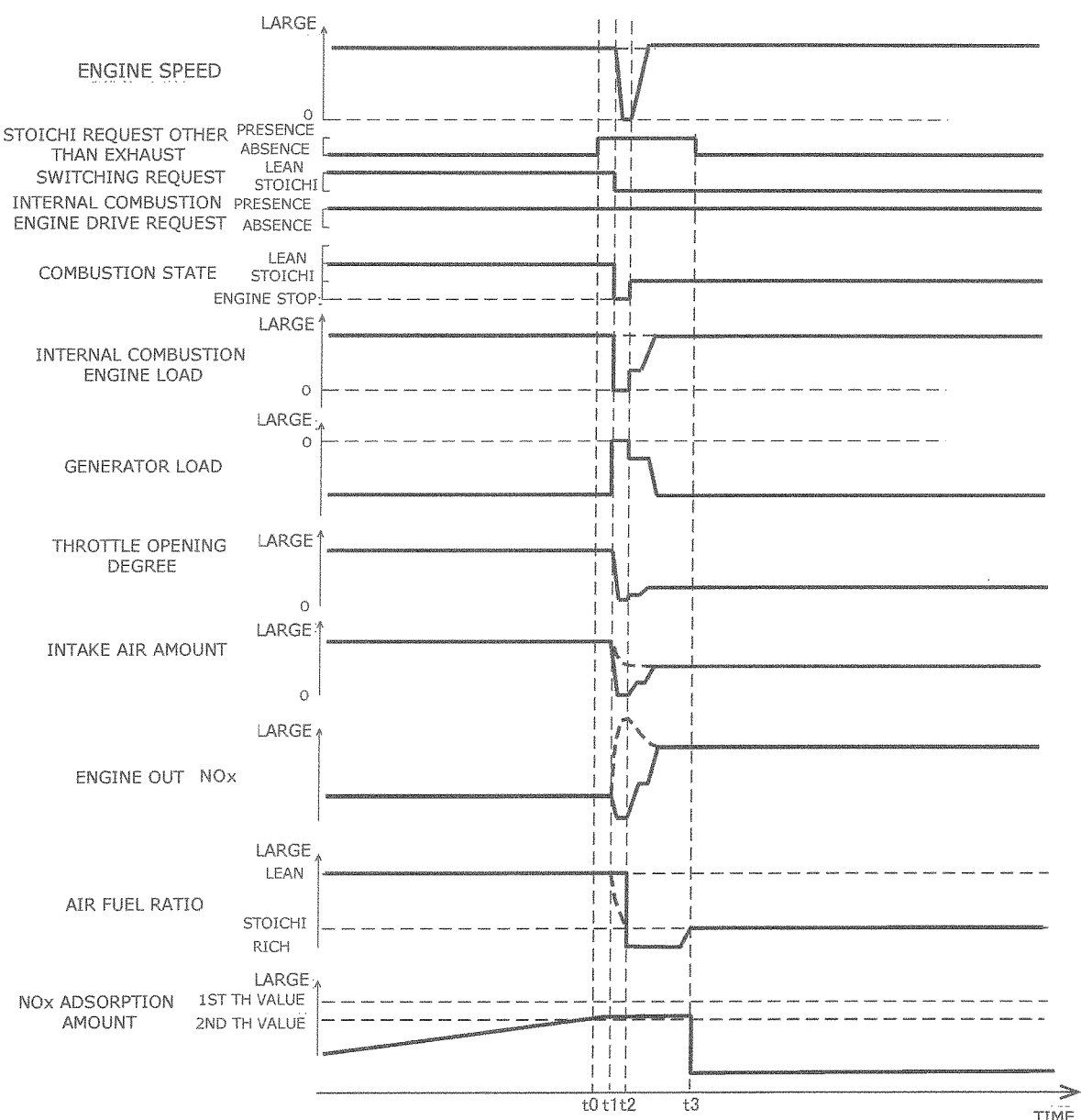
FIG. 5 is a timing chart showing variations of various parameters at a switching of a combustion mode.

FIG. 5 is a timing chart showing variations of various parameters when the combustion mode is switched from the lean combustion to the stoichiometric combustion after the temporary stop of the internal combustion engine 10. FIG. 5 shows a case in which the combustion mode is switched from the lean combustion to the stoichiometric combustion, and in which the NOx amount collected by the second catalyst 24 does not reach the first threshold value.

Time t0 in FIG. 5 is a timing at which the NOx amount caught by the second catalyst 24 reaches the second threshold value. With this, at time to in FIG. 5, the stoichiometric request by the exhaust gas is generated. Besides, at time to in FIG. 5, the stop of the internal combustion engine 10, and the switching of the combustion mode are not performed.

Time t1 in FIG. 5 is a timing at which the switching request by which the air fuel ratio is set to the stoichiometric air fuel ratio other than the exhaust gas is generated. In a case in which the switching request by which the air fuel ratio is set to the stoichiometric air fuel ratio other than the exhaust gas in a state in which the stoichiometric request by the exhaust gas is generated, even when the above-described internal combustion engine stop condition is not satisfied, the internal combustion engine 10 is stopped. Moreover, the combustion mode of the internal combustion engine 10 is switched from the lean combustion to the stoichiometric combustion. In the example of FIG. 5, the internal combustion engine 10 is stopped for the switching of the combustion mode at time t1. Moreover, the throttle valve is closed to be smaller than the throttle opening degree for the stoichiometric combustion. For example, at time t1 in FIG. 5, when the internal combustion engine 10 is not stopped, and when the air fuel ratio is started to be varied from the lean air fuel ratio toward the theoretical air fuel ratio (the stoichiometric air fuel ratio) in accordance with the air amount, the above-described intermediate air fuel ratio is used. Consequently, NOx (the engine out NOx) discharged from the internal combustion engine 10 is increased (cf. a bold broken line in FIG. 5).

Time t2 in FIG. 5 is a timing at which a predetermined time period is elapsed after the throttle opening degree becomes smaller than the throttle opening degree for the stoichiometric combustion after the stop (the engine speed is "0") of the rotation of the internal combustion engine 10. At time t2 in FIG. 5, the internal combustion engine 10 whose the rotation is stopped is restarted. Moreover, the throttle opening degree is started to be opened to the throttle opening degree for the stoichiometric combustion. After time t2 in FIG. 5, the throttle opening degree is stepwisely increased to be the throttle opening degree for the stoichiometric combustion.

The internal combustion engine 10 is configured to be started at the low load at the restart, to increase the load to the necessary load after the start so as to prevent the sudden torque increase. Moreover, the internal combustion engine 10 is configured to decrease the air amount at the NOx treatment so as to improve the NOx conversion ratio. Furthermore, at time t2 in FIG. 5, the rich spike is started at the same time of the restart of the internal combustion engine 10.

Time t3 in FIG. 5 is a timing at which the rich spike is finished. The NOx amount collected by the second catalyst 24 is reset to "0" after the rich spike.

Figure 6:
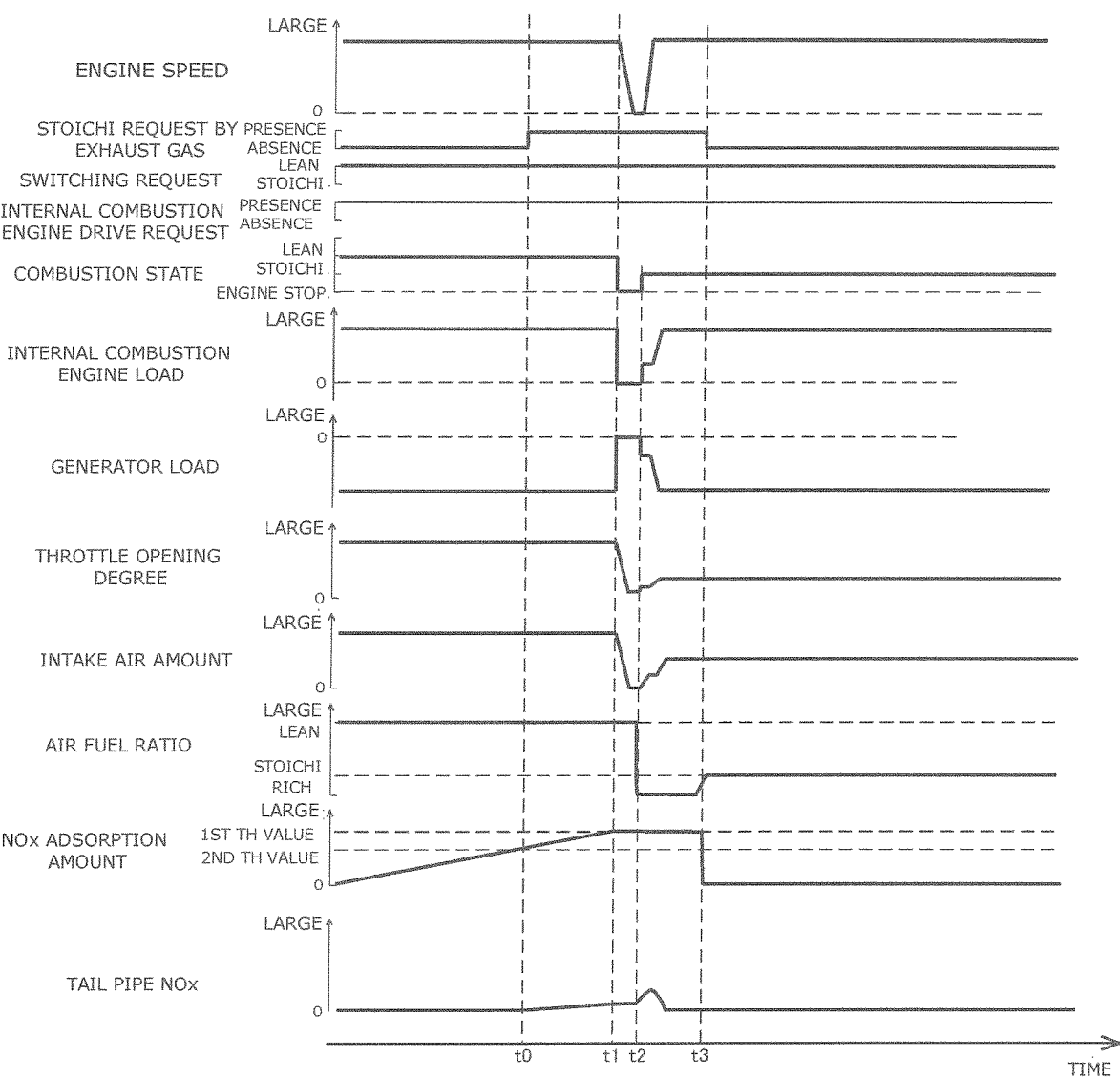
FIG. 6 is a timing chart showing the variations of the various parameters at the switching of the combustion mode.

FIG. 6 is a timing chart showing variations of the various parameters at the switching of the combustion mode from the lean combustion to the stoichiometric combustion at the stop of the internal combustion engine 10. FIG. 6 shows a case in which the combustion mode is switched from the lean combustion to the stoichiometric combustion when the NOx amount collected by the second catalyst 24 reaches the first threshold value.

Time t0 in FIG. 6 is a timing at which the NOx amount collected by the second catalyst 24 reaches the second threshold value. With this, at time to in FIG. 6, the stoichiometric request by the exhaust gas is generated. Besides, the stop of the internal combustion engine 10, and the switching of the combustion mode are not performed.

Time t1 in FIG. 6 is a timing at which the NOx amount collected by the second catalyst 24 reaches the first threshold value. In a case in which the NOx amount collected by the second catalyst 24 exceeds the first threshold value, even when the switching request other than the above-described exhaust gas, and the stop condition of the internal combustion engine are not satisfied, the internal combustion engine 10 is stopped. Moreover, the combustion mode of the internal combustion engine 10 is switched from the lean combustion to the stoichiometric combustion. In the example of FIG. 6, the internal combustion engine 10 is stopped at time t1 so as to switch the combustion mode. Moreover, the throttle valve is closed to be smaller than the throttle opening degree for the stoichiometric combustion.

Time t2 in FIG. 6 is a timing at which a predetermined time period is elapsed after the throttle opening degree becomes smaller than the throttle opening degree for the stoichiometric combustion after the stop (the engine speed is "0") of the rotation of the internal combustion engine 10. At time t2 in FIG. 6, the internal combustion engine 10 whose the rotation is stopped is restarted, and the throttle opening degree is started to be opened toward the throttle opening degree for the stoichiometric combustion. After time t2, the throttle opening degree is stepwisely increased to be the throttle opening degree for the stoichiometric combustion.

The internal combustion engine 10 is configured to be started by the low load at the restart, to increase the load to the necessary load after the start so as to prevent the sudden torque increase, and to decrease the air amount at the NOx treatment so as to improve the NOx conversion ratio. Moreover, at time t2 in FIG. 6, the rich spike is started at the same time of the restart of the internal combustion engine 10.

Time t3 in FIG. 6 is a timing at which the rich spike is finished. The NOx amount collected by the second catalyst 24 is reset to "0" after the end of the rich spike.

Figure 7:
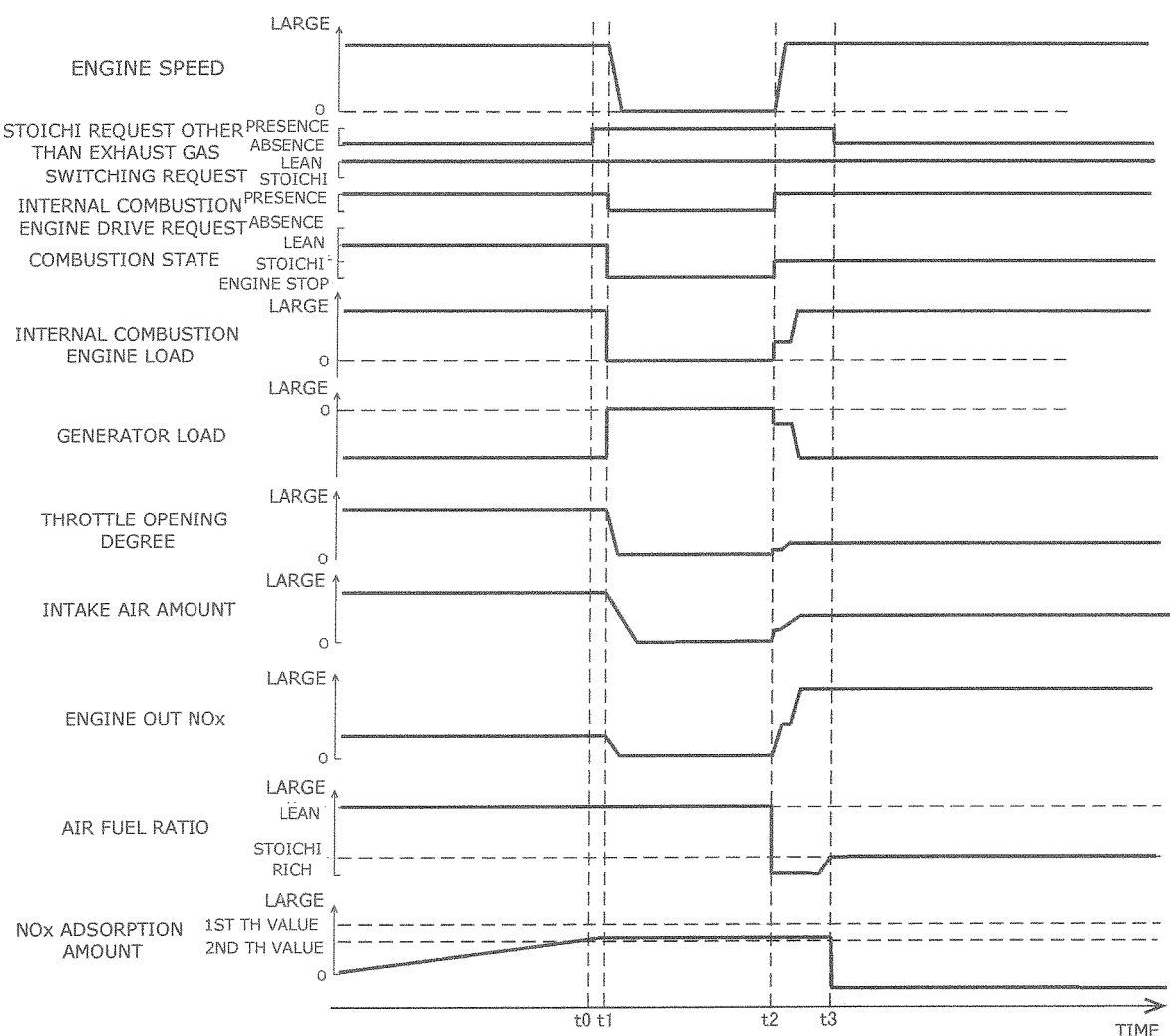
FIG. 7 is a timing chart showing the variations of the various parameters at the switching of the combustion mode.

FIG. 7 is a timing chart showing variations of the various parameters when the combustion mode is switched from the lean combustion to the stoichiometric combustion after the stop of the internal combustion engine 10. FIG. 7 shows a case in which the above-described stop condition of the internal combustion engine is satisfied in a state in which the stoichiometric request by the exhaust gas is generated.

Time t0 in FIG. 7 is a timing at which the NOx amount collected by the second catalyst 24 reaches the second threshold value. With this, at time to, the stoichiometric request by the exhaust gas is generated. Besides, the stop of the internal combustion engine 10, and the switching of the combustion mode are not performed at time to in FIG. 7.

Time t1 in FIG. 7 is a timing at which the stop condition of the internal combustion engine other than the above-described exhaust gas is satisfied. In a case in which the stop condition of the internal combustion engine is satisfied in a state in which the stoichiometric request by the exhaust gas is generated, even when the switching requirement other than the above-described exhaust gas is not generated, the internal combustion engine 10 is stopped. Moreover, the combustion mode of the internal combustion engine 10 is switched from the lean combustion to the stoichiometric combustion. In the example of FIG. 7, the internal combustion engine 10 is stopped for the switching of the combustion mode at time t1. Moreover, the throttle valve is closed to be smaller than the throttle opening degree for the stoichiometric combustion.

Time t2 in FIG. 7 is a timing at which the above-described start condition of the internal combustion engine is satisfied. In a case in which the internal combustion engine 10 is stopped by the satisfaction of the stop condition of the internal combustion engine in a state in which the stoichiometric request by the exhaust gas is generated, the internal combustion engine 10 is restarted at a timing of the satisfaction of the above-described start condition of the internal combustion engine, not at a timing at which a state in which the throttle valve is closed is continued during a predetermined time period after the stop of the rotation of the internal combustion engine 10 (the engine speed is "0"). At time t2 in FIG. 7, the internal combustion engine 10 whose the rotation is stopped is restarted. Moreover, the throttle opening degree is started to be opened to the throttle opening degree for the stoichiometric combustion. After time t2, the throttle opening degree is stepwisely increased to be the throttle opening degree for the stoichiometric combustion.

The internal combustion engine 10 is configured to be started at the low load at the restart, to increase the load to the necessary load after the start so as to prevent the sudden torque increase, and to decrease the air amount at the NOx treatment so as to improve the NOx conversion ratio. Moreover, at time t2 in FIG. 7, the rich spike is started at the same time of the restart of the internal combustion engine 10.

Time t3 in FIG. 7 is a timing at which the rich spike is finished. The NOx amount collected by the second catalyst 24 is reset to "0" after the end of the rich spike.

Figure 8:
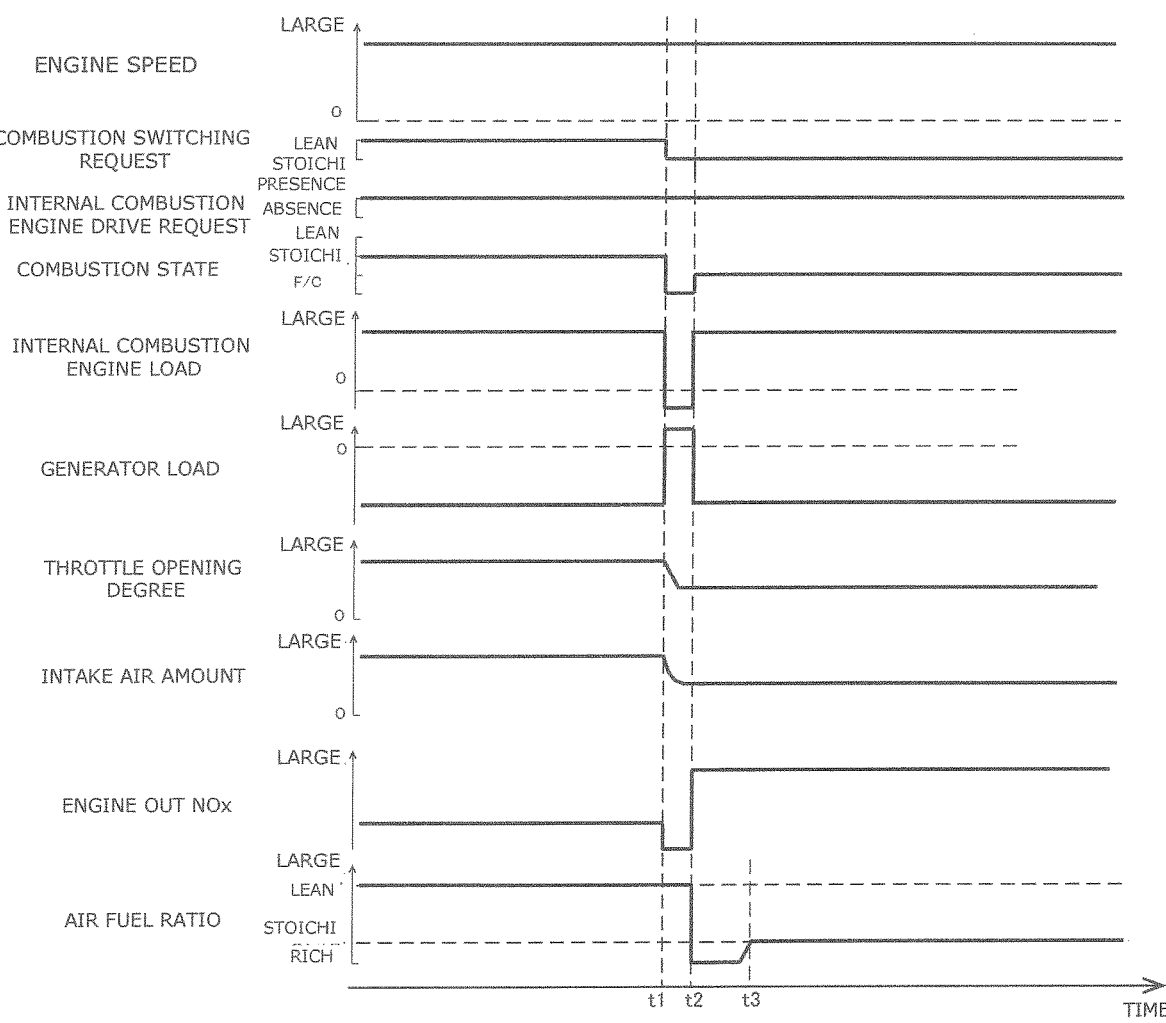
FIG. 8 is a timing chart showing the variations of the various parameters at the switching of the combustion mode.

FIG. 8 is a timing chart showing variations of the various parameters when the combustion mode is switched from the lean combustion to the stoichiometric combustion at the stop of the fuel supply to the internal combustion engine 10.

Time t1 in FIG. 8 is a timing at which the combustion switching request (the stoichiometric request by the exhaust gas, or the switching request) is generated. That is, time t1 in FIG. 8 is a timing at which a request of setting the air fuel ratio from the lean air fuel ratio to the stoichiometric air fuel ratio by the switching request, or the stoichiometric request by the exhaust gas.

At time t1 in FIG. 8, the fuel cut is started, and the opening degree of the throttle valve is switched to the throttle opening degree for the stoichiometric combustion. The internal combustion engine 10 is switched to the throttle opening degree for the stoichiometric combustion during the fuel cut. Accordingly, it is possible to suppress the increases of the gas volume, and the NOx (the tail pipe NOx) discharged from the tail pipe through the second catalyst 24 at the switching of the combustion mode. Moreover, in the example of FIG. 8, during a period from time t1 to time t2, the generator 9 is driven so as not to decrease the engine speed of the internal combustion engine 10. Time t2 in FIG. 8 is a timing at which the intake air amount reaches the target value for the stoichiometric combustion. At time t2 in FIG. 8, the fuel cut is canceled (finished), and the rich spike is simultaneously started. Time t3 in FIG. 8 is a timing at which the rich spike is finished.

Figure 9:
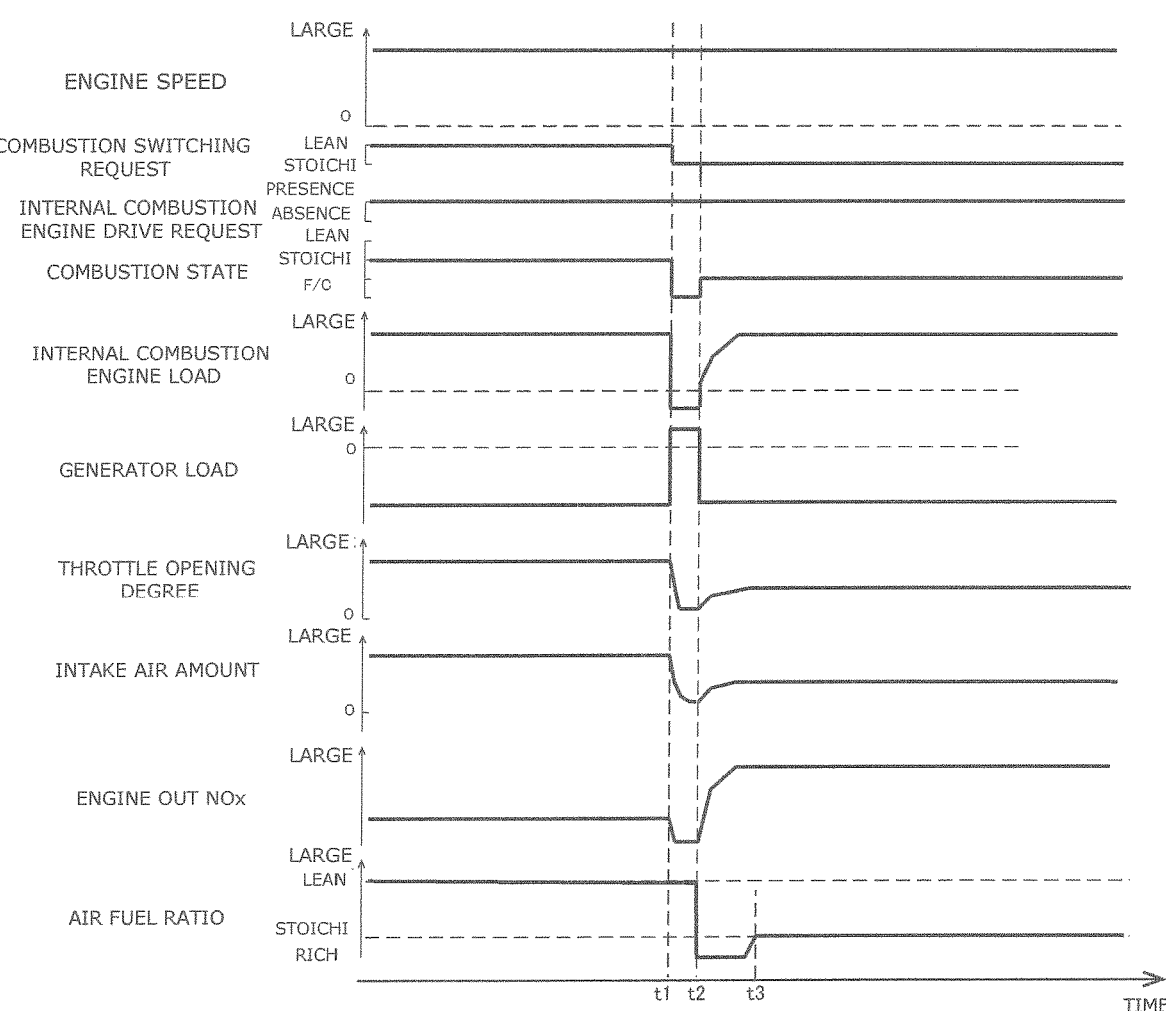
FIG. 9 is a timing chart showing the variations of the various parameters at the switching of the combustion mode.

FIG. 9 is a timing chart showing variations of the various parameters when the combustion mode is switched from the lean combustion to the stoichiometric combustion by the stop of the fuel supply to the internal combustion engine 10. FIG. 9 shows a case in which the throttle opening degree is closed during the fuel cut to be smaller than the throttle opening degree for the stoichiometric combustion.

Time t1 in FIG. 9 is a timing at which the combustion switching request (the switching request, or the stoichiometric request by the exhaust gas) is generated. That is, time t1 in FIG. 9 is a timing at which the request by which the air fuel ratio is switched from the lean air fuel ratio to the stoichiometric fuel ratio is generated by the switching request, or the stoichiometric request by the exhaust gas. At time t1 in FIG. 9, the fuel cut is started. Moreover, the opening degree of the throttle valve is switched to be smaller than the throttle opening degree for the stoichiometric combustion. The internal combustion engine 10 is configured to be switched to the throttle opening degree during the fuel cut. Accordingly, it is possible to suppress the increases of the gas volume, and NOx (the tail pipe NOx) discharged from the tail pipe through the second catalyst 24 at the switching of the combustion mode. Moreover, in the example of FIG. 9, during time t1 to time t2, the generator 9 is driven so as not to decrease the engine speed of the internal combustion engine 10.

Time t2 in FIG. 9 is a timing at which a predetermined time period is elapsed from a timing at which the throttle opening degree reaches the target opening degree smaller than the throttle opening degree for the stoichiometric combustion. At time t2 in FIG. 9, the rich spike is started at the same time of the cancel (the end) of the fuel cut. Moreover, at time t2 in FIG. 9, the throttle opening degree is started to be opened to the throttle opening degree for the stoichiometric combustion. The throttle opening degree is gradually increased to the throttle opening degree for the stoichiometric combustion after time t2 in FIG. 9. Time t3 in FIG. 9 is a timing at which the rich spike is finished.

Figure 10:
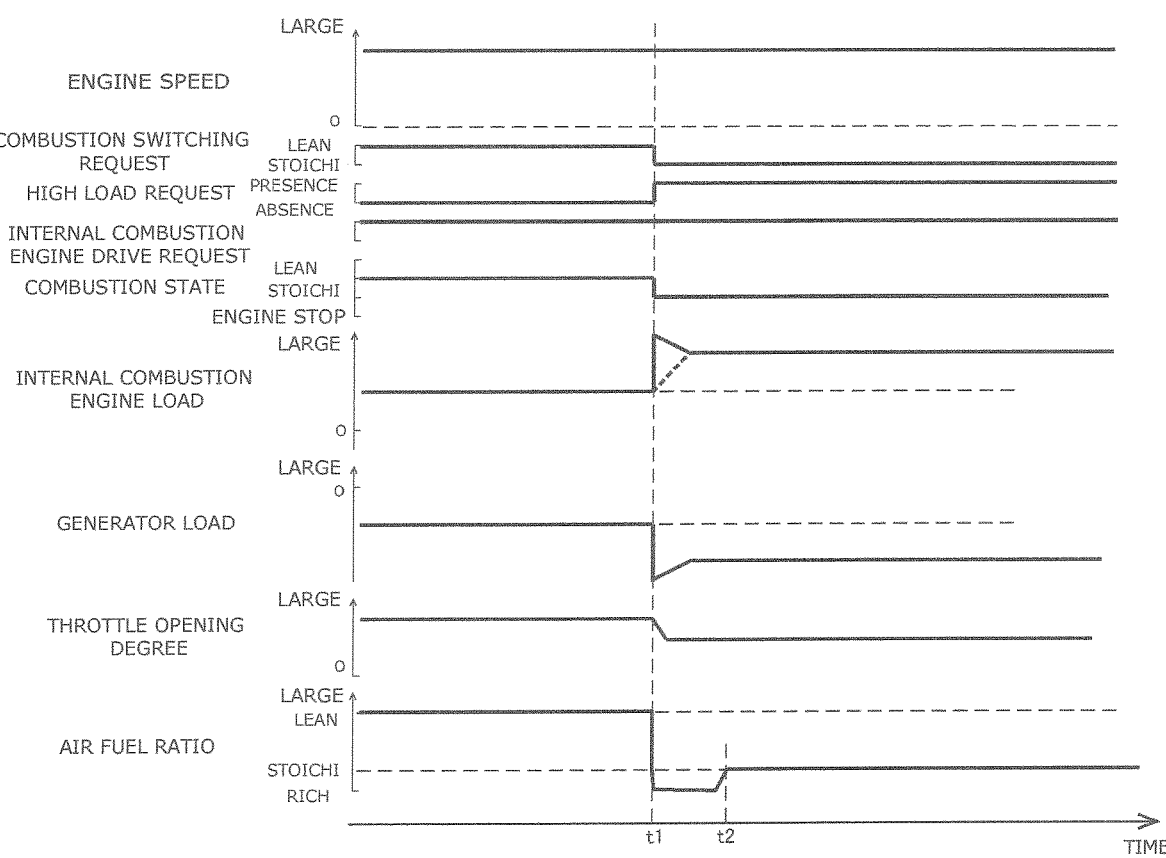
FIG. 10 is a timing chart showing the variations of the various parameters at the switching of the combustion mode.

FIG. 10 is a timing chart showing variations of various parameters when the combustion mode is switched from the lean combustion to the stoichiometric combustion when the request torque of the internal combustion engine 10 is greater than a predetermined value (when the large torque request is generated).

Time t1 in FIG. 10 is a timing at which the combustion switching request (the switching request or the stoichiometric request by the exhaust gas) is generated. That is, time t1 in FIG. 10 is a timing at which the request for setting the air fuel ratio from the lean air fuel ratio to the stoichiometric air fuel ratio is generated by the switching request or the stoichiometric request by the exhaust gas. At time t1 in FIG. 10, the request torque of the internal combustion engine 10 is greater than the predetermined value. Accordingly, the opening degree of the throttle valve is switched to the throttle opening degree for the stoichiometric combustion. Moreover, the air fuel ratio is immediately switched to start the rich spike. As shown by a bold broken line in FIG. 10, in a case in which the engine load is gradually increased from time t1 in FIG. 10, it is possible suppress the torque shock. However, in the sudden acceleration and so on, when the request torque of the internal combustion engine 10 is greater than the predetermined value, the large unnatural feeling is not provided to the driver even when there is the torque shock. Accordingly, at time t1, the combustion mode is immediately switched from the lean combustion to the stoichiometric combustion. Time t2 in FIG. 10 is a timing at which the rich spike is fished.

Figure 11:
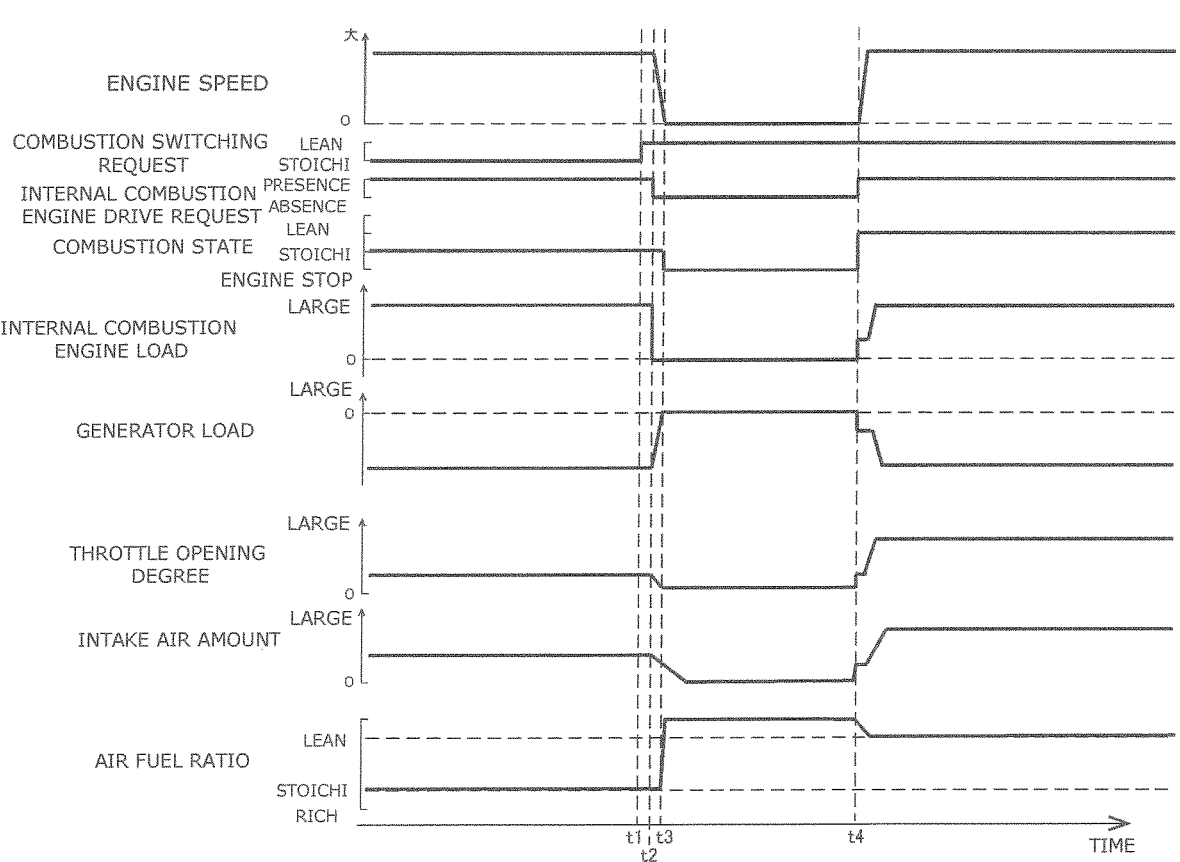
FIG. 11 is a timing chart showing the variations of the various parameters at the switching of the combustion mode.

FIG. 11 is a timing chart showing variations of various parameters when the combustion mode is switched from the stoichiometric combustion to the lean combustion at the stop of the internal combustion engine 10.

Time t1 in FIG. 11 is a timing at which the combustion switching request (for example, the switching request) for switching the air fuel ratio from the stoichiometric air fuel ratio to the lean air fuel ratio is generated. Besides, at time t1 in FIG. 11, the switching of the combustion mode, and the stop of the internal combustion engine 10 are not performed.

Time t2 in FIG. 11 is a timing at which the above-described internal combustion engine stop condition is satisfied.

When the request for the switching of the combustion mode of the internal combustion engine 10 from the stoichiometric combustion to the lean combustion is generated, during the predetermined time period after the generation of this request, the combustion mode is switched waiting for the satisfaction of the internal combustion engine stop condition. That is, when the internal combustion engine stop condition is not satisfied during the predetermined time period after the generation of the request, the internal combustion engine 10 is stopped after the predetermined time period after the generation of the request. In the example of FIG. 11, for the switching of the combustion mode at time t2, the internal combustion engine 10 is stopped. Moreover, the throttle valve is closed to be smaller than the throttle opening degree for the stoichiometric combustion.

Time t3 in FIG. 11 is a timing at which the engine speed of the internal combustion engine 10 becomes "O". The air fuel ratio is switched to the air fuel ratio larger than the lean air fuel ratio at time t3 in FIG. 11.

Time t4 in FIG. 11 is a timing at which the above-described internal combustion engine start condition is satisfied. At time t4 in FIG. 11, the internal combustion engine 10 whose the rotation is stopped is restarted. Moreover, the throttle opening degree is started to be opened to the throttle opening degree for the lean combustion. After time t4, the throttle opening degree is stepwisely increased to become the throttle opening degree for the lean combustion.

Figure 12:
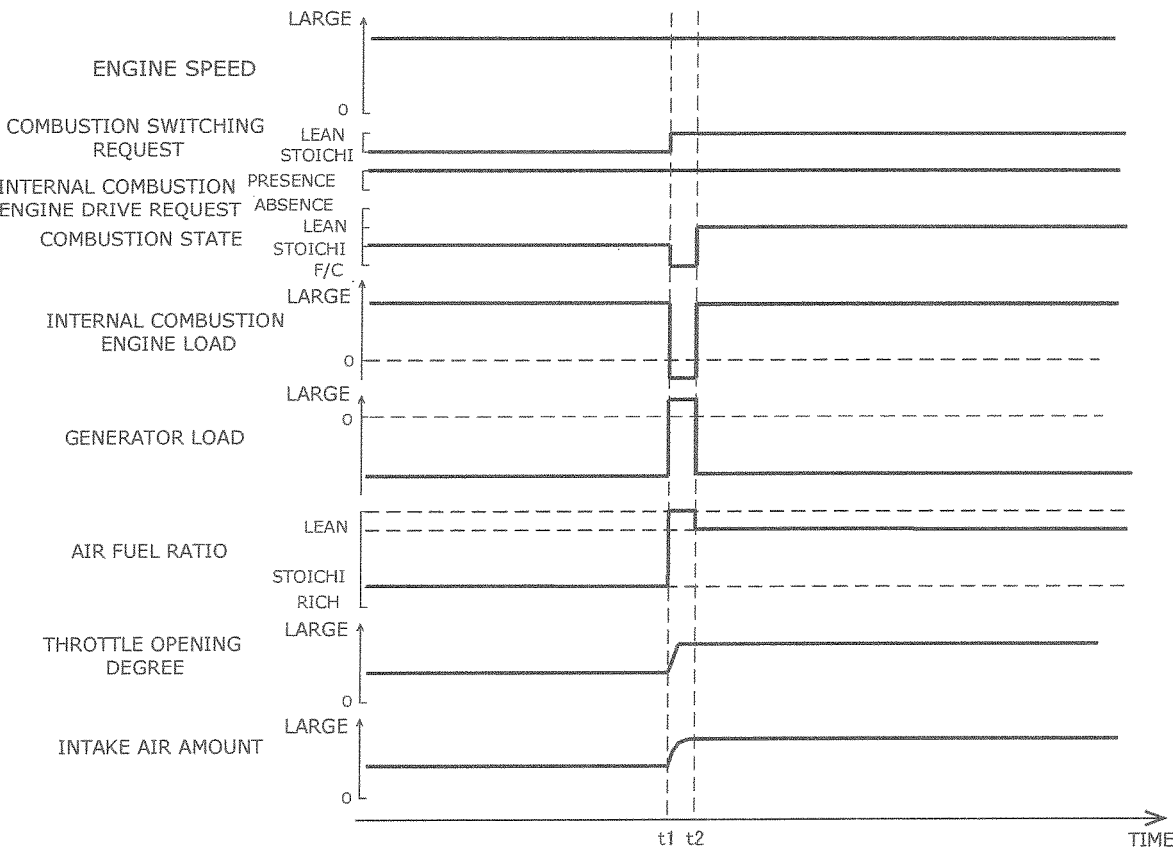
FIG. 12 is a timing chart showing the variations of the various parameters at the switching of the combustion mode.

FIG. 12 is a timing chart showing variations of various parameters when the fuel supply to the internal combustion engine 19 is stopped, so as to switch the combustion mode from the stoichiometric combustion to the lean combustion.

Time t1 in FIG. 12 is a timing at which the combustion switching request (for example, the switching request) for switching the air fuel ratio from the stoichiometric air fuel ratio to the lean air fuel ratio is generated. At time t1 in FIG. 12, the fuel cut is started, and the opening degree of the throttle valve is switched to the throttle opening degree for the lean combustion. Moreover, in the example of FIG. 12, the generator 9 is driven so that the engine speed of the internal combustion engine 10 is not decreased.

Time t2 in FIG. 12 is a timing at which the intake air amount reaches the target value for the lean combustion. At time t2 in FIG. 12, the fuel cut is canceled (finished).

Hereinabove, the concrete example according to the present invention is explained. However, the present invention is not limited to the above-described embodiment. Various variations may be included as long as they are not deviated from the present invention.

For example, the hybrid vehicle to which the present invention is applied may be hybrid vehicles other than the series hybrid vehicle.

The above-described embodiment relates to the control method for the hybrid vehicle, and the control device for the hybrid vehicle.

The invention claimed is:

1. A control method for a hybrid vehicle including a first motor configured to supply a generated electric power to a battery, a second motor configured to drive a driving wheel by the electric power from the battery, or the electric power generated by the first motor, and an internal combustion engine configured to drive the first motor, the hybrid vehicle being configured to switch between a stoichiometric combustion in which a target air fuel ratio of the internal combustion engine is set to a theoretical air fuel ratio, and a lean combustion in which the target air fuel ratio is set to be leaner than the theoretical air fuel ratio, the control method for the hybrid vehicle comprising:

when a combustion mode is switched from the lean combustion to the stoichiometric combustion, stopping a fuel supply to the internal combustion engine;

decreasing an intake air amount of the internal combustion engine during the stop;

setting the target air fuel ratio of the internal combustion engine to the theoretical air fuel ratio, or the air fuel ratio richer than the theoretical air fuel ratio, in a state in which the intake air amount of the internal combustion engine is decreased; and restarting the internal combustion engine, wherein when a request torque of the internal combustion engine is greater than a predetermined value, in a case in which the combustion mode of the internal combustion engine is switched from the lean combustion to the stoichiometric combustion, the air fuel ratio is switched with the fuel supply continued.

2. The control method for the hybrid vehicle as claimed in claim 1, wherein when the combustion mode is switched from the lean combustion to the stoichiometric combustion, a rotation of the internal combustion engine is stopped, and the air fuel ratio is switched to the theoretical air fuel ratio, or the air fuel ratio richer than the theoretical air fuel ratio at the restart of the internal combustion engine.

3. The control method for the hybrid vehicle as claimed in claim 2, wherein the hybrid vehicle comprises an NOx trap configured to collect NOx in an exhaust gas;

when the NOx amount collected by the NOx trap catalyst becomes equal to or greater than a predetermined first threshold value, the combustion mode is switched from the lean combustion to the stoichiometric combustion; and when the NOx amount collected by the NOx trap catalyst becomes smaller than the first threshold value, and equal to or greater than a predetermined second threshold value smaller than the first threshold value, the combustion mode is switched from the lean combustion to the stoichiometric combustion after a satisfaction of a predetermined switching request.

4. The control method for the hybrid vehicle as claimed in claim 3, wherein when the NOx amount collected by the NOx trap catalyst is smaller than the first threshold value, and equal to or greater than the second threshold value, in a case in which the internal combustion engine is stopped by a satisfaction of a predetermined internal combustion stop condition, the internal combustion engine is restarted after waiting for a satisfaction of a predetermined internal combustion engine start condition.

5. The control method for the hybrid vehicle as claimed in claim 2, wherein when the combustion mode is switched from the lean combustion to the stoichiometric combustion, an opening degree of a throttle valve configured to control an intake air amount of the internal combustion engine is varied to an opening degree according to the target air fuel ratio during the stop of the rotation of the internal combustion engine, or during the fuel cut of the internal combustion engine.

6. The control method for the hybrid vehicle as claimed in claim 2, wherein when the combustion mode is switched from the lean combustion to the stoichiometric combustion, at the restart of the internal combustion engine from the stop of the rotation of the internal combustion engine, or at the fuel cut recovery of the internal combustion engine, the opening degree of the throttle valve configured to control the intake air amount of the internal combustion engine is varied to the opening degree smaller than the opening degree according to the target air fuel ratio, and then the opening degree of the throttle valve is varied to the opening degree according to the target air fuel ratio.

7. The control method for the hybrid vehicle as claimed in claim 1, wherein when the combustion mode is switched from the lean combustion to the stoichiometric combustion, a fuel cut to stop the fuel supply to the internal combustion engine is performed, the air fuel ratio is switched to the theoretical air fuel ratio, or the air fuel ratio richer than the theoretical air fuel ratio at a fuel cut recovery at which the fuel supply to the internal combustion engine is restarted.

8. The control method for the hybrid vehicle as claimed in claim 1, wherein when the combustion mode is switched from the stoichiometric combustion to the lean combustion, the fuel supply to the internal combustion engine is stopped, and then the internal combustion engine is restarted by setting the target air fuel ratio to the air fuel ratio leaner than the theoretical air fuel ratio.

9. The control method for the hybrid vehicle as claimed in claim 8, wherein when the combustion mode is switched from the stoichiometric combustion to the lean combustion, the rotation of the internal combustion engine is stopped, and the air fuel ratio is switched to the air fuel ratio leaner than the theoretical air fuel ratio at the restart of the internal combustion engine.

10. The control method for the hybrid vehicle as claimed in claim 8, wherein when the combustion mode is switched from the stoichiometric combustion to the lean combustion, the fuel cut to stop the fuel supply to the internal combustion engine is performed, the air fuel ratio is switched to the air fuel ratio leaner than the theoretical air fuel ratio, at the fuel cut recovery at which the fuel supply to the internal combustion engine is restarted.

11. A control device for a hybrid vehicle comprising:
a first motor configured to supply a generated electric power to a battery;
a second motor configured to drive a driving wheel by the electric power from the battery, or the electric power generated by the first motor;
an internal combustion engine configured to drive the first motor; and
a controller configured to switch between a stoichiometric combustion in which a target air fuel ratio of the internal combustion engine is set to a theoretical air fuel ratio, and a lean combustion in which the target air fuel ratio is set to be leaner than the theoretical air fuel ratio,
wherein when the combustion mode is switched from the lean combustion to the stoichiometric combustion while a request torque of the internal combustion engine is less than a predetermined value, the controller is configured to
stop a fuel supply to the internal combustion engine,
decrease an intake air amount of the internal combustion engine during the stop,
set the target air fuel ratio of the internal combustion engine to the theoretical air fuel ratio, or the air fuel ratio richer than the theoretical air fuel ratio, in a state in which the intake air amount of the internal combustion engine is decreased, and
restart the internal combustion engine,
wherein when the combustion mode of the internal combustion engine is switched from the lean combustion to the stoichiometric combustion while the request torque of the internal combustion engine is greater than the predetermined value, the controller is configured to switch the target air fuel ratio with the fuel supply continued.

* * * * *